(12) United States Patent
Kamlani

(10) Patent No.: US 9,681,270 B2
(45) Date of Patent: Jun. 13, 2017

(54) DEVICE LOCALIZATION BASED ON A LEARNING MODEL

(71) Applicant: OpenTV, Inc., San Francisco, CA (US)

(72) Inventor: Ari Ranjit Kamlani, San Francisco, CA (US)

(73) Assignee: OpenTV, Inc., San Francisco, CA (US)

( * ) Notice: Subject to any disclaimer, the term of this patent is extended or adjusted under 35 U.S.C. 154(b) by 307 days.

(21) Appl. No.: 14/311,077

(22) Filed: Jun. 20, 2014

(65) Prior Publication Data

US 2015/0371139 A1 Dec. 24, 2015

(51) Int. Cl.
*G06F 15/18* (2006.01)
*H04W 4/02* (2009.01)
*G06N 3/02* (2006.01)

(52) U.S. Cl.
CPC .............. *H04W 4/028* (2013.01); *G06N 3/02* (2013.01); *H04W 4/023* (2013.01)

(58) Field of Classification Search
USPC .......................................................... 706/12
See application file for complete search history.

(56) References Cited

U.S. PATENT DOCUMENTS

| | | | |
|---|---|---|---|
| 7,158,078 B2* | 1/2007 | Ninomiya | G01S 3/46 342/442 |
| 7,265,716 B2* | 9/2007 | Ninomiya | G01S 3/46 342/442 |
| 7,304,610 B2* | 12/2007 | Ninomiya | G01S 3/46 342/442 |
| 7,319,428 B2* | 1/2008 | Ninomiya | G01S 3/46 342/442 |
| 7,853,269 B2* | 12/2010 | van de Groenendaal | G01S 5/12 342/453 |
| 8,179,870 B2* | 5/2012 | Tharappel | H04L 63/0428 370/338 |

(Continued)

FOREIGN PATENT DOCUMENTS

| | | |
|---|---|---|
| GB | 1475601 A | 6/1977 |
| WO | WO-2015195579 A1 | 12/2015 |

OTHER PUBLICATIONS

Adaptive Sampling of RF Fingerprints for Fine-Grained Indoor Localization Xiao-Yang Liu; Shuchin Aeron; Vaneet Aggarwal; Xiaodong Wang; Min-You Wu IEEE Transactions on Mobile Computing Year: 2016, vol. 15, Issue: 10 pp. 2411-2423, DOI: 10.1109/TMC.2015.2505729 IEEE Journals & Magazines.*

(Continued)

*Primary Examiner* — Michael B Holmes
(74) *Attorney, Agent, or Firm* — Schwegman Lundberg & Woessner, P.A.

(57) ABSTRACT

Methods and systems of localizing a device are presented. In an example method, a communication signal from a device is received by a wireless reference point during a period of time. A sequence of values is generated from the communication signal, as received by the wireless reference point, during the period of time. The sequence of values is supplied to a learning model configured to generate an output based on past values of the sequence of values and at least one predicted future value of the sequence of values. The current location of the device is estimated during the period of time based on the output of the learning model.

18 Claims, 9 Drawing Sheets

(56) References Cited

U.S. PATENT DOCUMENTS

| | | | | |
|---|---|---|---|---|
| 8,542,662 | B2* | 9/2013 | Tharappel | H04L 63/0428 370/338 |
| 8,571,574 | B2* | 10/2013 | van de Groenendaal | G01S 5/12 342/146 |
| 8,831,568 | B2* | 9/2014 | Cherian | G06F 15/177 370/338 |
| 9,253,712 | B2* | 2/2016 | Cherian | G06F 15/177 |
| 2005/0181804 | A1 | 8/2005 | Misikangas et al. | |
| 2006/0270939 | A1 | 11/2006 | Wariar et al. | |
| 2010/0057237 | A1 | 3/2010 | Kettaneh et al. | |
| 2010/0135178 | A1 | 6/2010 | Aggarwal et al. | |
| 2012/0190380 | A1 | 7/2012 | Dupray et al. | |
| 2015/0332145 | A1* | 11/2015 | Vasseur | G06N 5/04 706/12 |

OTHER PUBLICATIONS

Semi-Supervised Positioning Algorithm in Indoor WLAN Environment Ying Xia; Lin Ma; Zhongzhao Zhang; Yao Wang 2015 IEEE 81st Vehicular Technology Conference (VTC Spring) Year: 2015 pp. 1-5, DOI: 10.1109/VTCSpring.2015.7146079 IEEE Conference Publications.*

Table of contents 2016 Fifth International Conference on Agro-Geoinformatics (Agro-Geoinformatics) Year: 2016 pp. 1-8, DOI: 10.1109/Agro-Geoinformatics.2016.7577597 IEEE Conference Publications.*

"International Application Serial No. PCT/US15/35882, International Search Report mailed Sep. 11, 2015", 2 pgs.

"International Application Serial No. PCT/US15/35882, Written Opinion mailed Sep. 11, 2015", 6 pgs.

"Deep learning", Wikipedia, [Online]. Retrieved from the Internet: <URL: http://en.wikipedia.org/w/index.php?title=Deep_learning&printable=yes>, (Accessed May 28, 2014), 12 pgs.

"Indoor Positioning System", Wikipedia, [Online]. Retrieved from the Internet: <URL: http://en.wikipedia.org/w/index.php?title=Indoor_positioning_system&printable=yes>, (Accessed May 12, 2014), 10 pgs.

"Radio fingerprinting", Wikipedia, [Online]. Retrieved from the Internet: <URL: http://en.wikipedia.org/w/index.php?title=Radio_fingerprinting&printable=yes, (Accessed May 13, 2014), 1 pg.

"Real-time Locating System", Wikipedia, [Online]. Retrieved from the Internet: <URL: http://en.wikipedia.org/w/index.php?title=Real-time_locating_system&printable=yes>, (Accessed May 12, 2014), 9 pgs.

"Wi-Fi positioning system", Wikipedia, [Online]. Retrieved from the Internet: <URL: http://en.wikipedia.org/w/index.php?title=Wi-Fi_positioning_system&printable=yes, (Accessed May 12, 2014), 2 pgs.

King, Rachel, "Pay Pal Beacon Promises Hands-Free Mobile Payments via Bluetooth LE", Between the Lines, [Online]. Retrieved from the Internet: <URL: http://www.zdnet.com/paypal-beacon-promises-hands-free-mobile-payments-via-bluetooth-le-7000020437/>, (Sep. 9, 2013), 4 pgs.

"International Application Serial No. PCT/US2015/035882, International Preliminary Report on Patentability mailed Dec. 29, 2016", 8 pgs.

* cited by examiner

DEVICE LOCALIZATION BASED ON A LEARNING MODEL

FIELD

This application relates generally to the field of electronic communications and, in an example embodiment, to localization of a device based on a learning model.

BACKGROUND

Localization, or the determination or estimation of the location of an electronic device, often involves the use of Global Positioning System (GPS) circuitry operating at the device. The device may receive GPS data from a number of GPS satellites, and process that received data to determine a location of the device. However, in some environments, such as inside buildings, parking garages, or other obstructions to satellite signals, the device may not be capable of receiving the GPS data.

Various forms of radio frequency (RF) localization may be employed instead of GPS localization to locate a device in such environments. Oftentimes, in such systems, a characteristic of a communication signal received from the device, such as the Received Signal Strength Indicator (RSSI), is used to determine a location of the device relative to a "reference point" device, such as one or more signal readers, wireless access points, or infrastructure devices designed specifically for localization of devices. The accuracy of such systems is typically enhanced by increasing the number of reference points.

Such localization systems also often employ a "fingerprinting" or "site surveying" operation prior to being placed into service for RF localization of actual user devices. During the fingerprinting or site surveying, a test device that transmits a signal may be moved throughout an area proximate the reference points, typically along a predetermined path, to provide reference information against which received signals from user devices are compared to localize those devices. Structural changes in the area of interest, such as location and/or orientation changes in walls, partitions, barriers, and furniture, often reduce the accuracy of a previous fingerprint or survey of the area, indicating that another fingerprinting or surveying operation may be beneficial. Further, temporary changes in the RF environment in the area of interest, such as the presence of people, may alter the reach or strength of the communication signals received at the reference points from the user devices, thus complicating the task of determining the location of the devices relative to the reference points.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of the embodiments disclosed herein. It will be evident, however, to one skilled in the art that the embodiments may be practiced without these specific details.

Figure 1:
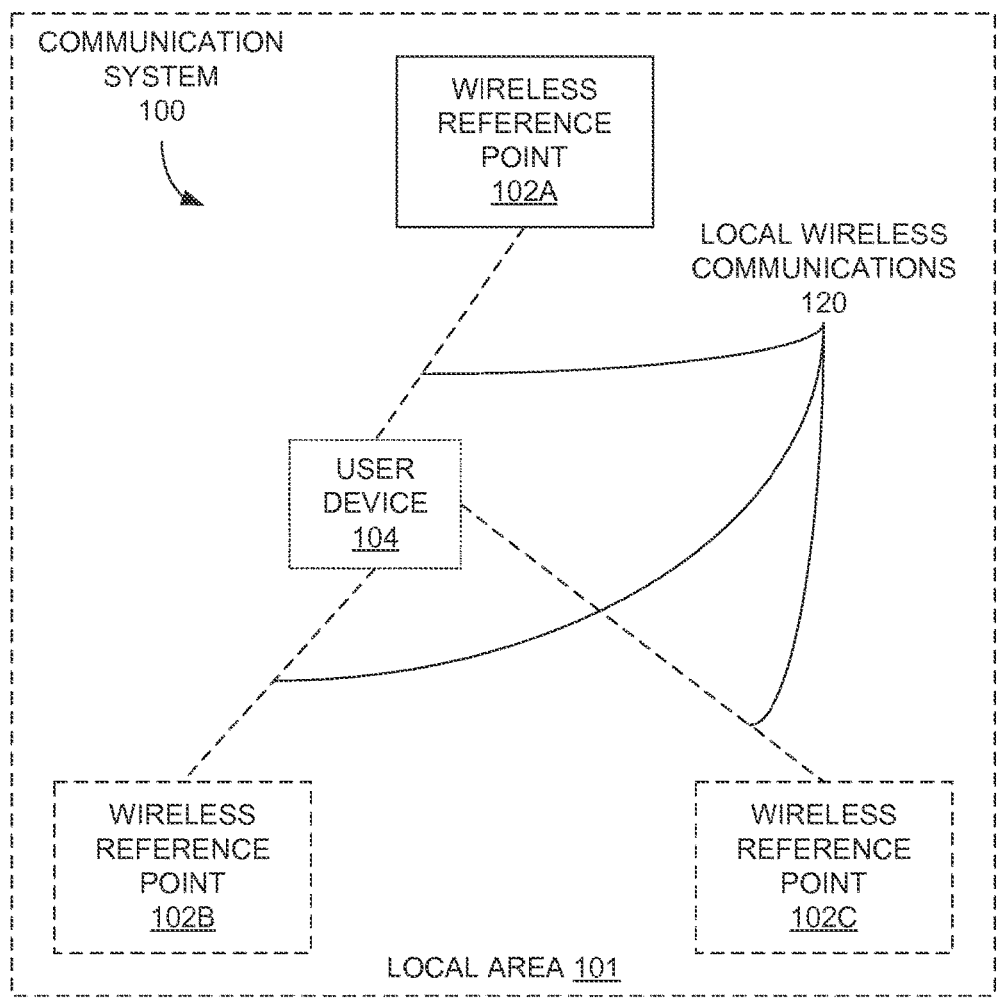
FIG. 1 is a block diagram of an example communication system employable for localizing a device based on a learning model.

FIG. 1 is a block diagram of an example communication system 100 employable for localizing a device (e.g., a user device 104) based on a learning model. In the communication system 100, a local area 101, which may be a home, apartment, department store, restaurant, bar, arena, stadium, or other similarly defined area, may include at least one wireless reference point 102A that may engage in local wireless communication with the user device 104. In the specific example of FIG. 1, three wireless reference points 102A, 102B, and 102C (each, alternatively, wireless reference point 102) are employed to at least receive local wireless communications 120 from the user device 104. However, one or more such wireless reference points 102 may be employed in other embodiments. As described in greater detail below, any or all of the wireless reference points 102 may process the local wireless communications received from the user device 104 to localize, or determine within some margin of error the location of, the user device 104. Further, each of these wireless reference points 102 may remain at a fixed location within the local area 101 to facilitate localization of the user device 104.

Examples of a wireless reference point 102 may include, but are not limited to, a wireless access point for a wireless local area network (LAN), such as a Wi-Fi® wireless access point or router; a Bluetooth® communication device; a radio-frequency identification (RFID) tag reader; a cellular network (e.g., third-generation (3G) or fourth-generation (4G)) communication device; a ZigBee® or other personal area network (PAN) communication device; or other wireless communication device capable of engaging in wireless communication with the user device 104 via any wireless communication protocol as a router, as a peer device, or in any other communication capacity. In other examples, the wireless reference point 102 may be a device that operates strictly for the purpose of localization of the user device 104. Such a wireless reference point 102 may, for example, merely intercept local wireless communications between the user device 104 and another wireless reference point 102 or another user device 104 and process those communications to localize the user device 104.

Examples of the user device 104 may include, but are not limited to, desktop, laptop, and tablet computers; gaming systems; smart phones; personal digital assistants (PDAs); smart televisions; smart appliances; and other communication devices capable of communicating with a wireless reference point 102 via any wireless communication network protocol, such as, for example, Wi-Fi®, Bluetooth®, RFID, 3G, 4G, ZigBee®, or any other LAN, PAN, or other localized wireless network protocol. While a single user device 104 is depicted in FIG. 1, any number of user devices 104 capable of communicating with the wireless reference points 102 may be localized within the local area 101.

Figure 2:
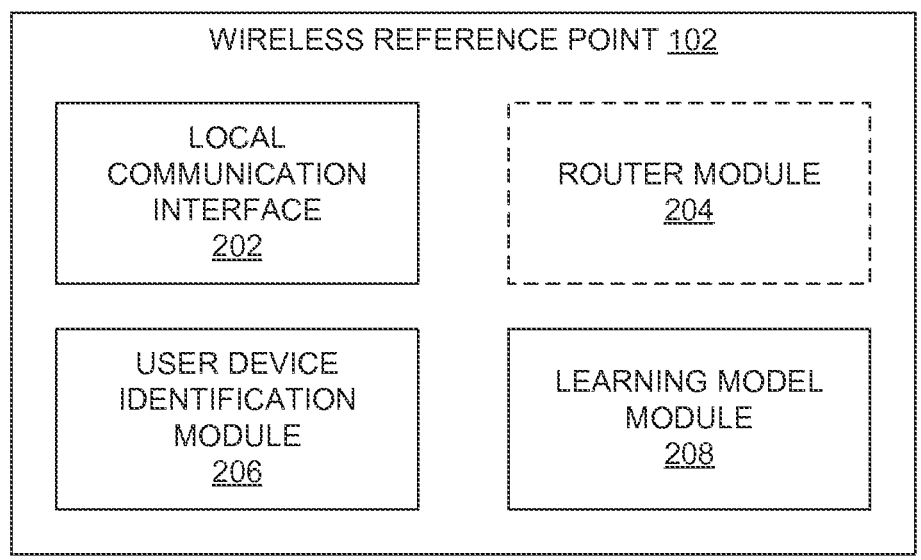
FIG. 2 is a block diagram of an example wireless reference point employable in the communication system of FIG. 1.

FIG. 2 is a block diagram of an example of the wireless reference point 102 employable in the communication system 100 of FIG. 1. In this example, wireless reference point 102 may include a local communication interface 202, a router module 204, a user device identification module 206, and a learning model module 208. Each of these modules, as well as other modules described herein, may include hardware, software, or some combination thereof for performing the various functions corresponding to the module, as is described more fully below. Other possible components, such as, for example, a wide area network (WAN) interface, a user interface, and so on, may be included in the wireless reference point 102, but are not explicitly illustrated in FIG. 2 to simplify the following discussion. Additionally, not all components depicted in FIG. 2 and other drawings may be included in all embodiments. Further, components shown in FIG. 2 and other block diagrams herein may be further divided into separate components, or may be combined to create fewer, larger components.

The local communication interface 202 may be configured to facilitate local wireless communication between the wireless reference point 102 and one or more of the user devices 104 of FIG. 1. Accordingly, the local communication interface 202 may be capable of communicating via local wireless communications 120 via any one or more of 3G, 4G, ZigBee®, or any other LAN, PAN, or other localized wireless network protocol, as mentioned above.

The router module 204, if included in the wireless reference point 102, may be configured to serve as a router for communications between user devices 104 of the local area 101, as well as possibly between each user device 104 and other networks, such as a WAN. In other examples, the wireless reference point 102 may be communicatively coupled with an external LAN router to facilitate communication among the wireless reference point 102 and the user devices 104.

The user device identification module 206 may be configured to identify the one or more user devices 104 in the local area 101 based on information included in the local wireless communications 120 involving the user devices 104. For example, the local wireless communications 120 may include data packets that incorporate an identifier for the user device 104 transmitting the data packets. Such an identifier may be, for example, a MAC (Media Access Control) address of the user device 104, but the user device identification module 206 may employ any other identifier that uniquely identifies the user device 104 and, thus, the local wireless communications 120 transmitted thereby.

The learning model module 208 may be configured to employ a learning model to process those local wireless communications 120 associated with each user device 104 located within the local area 101, as identified by the user device identification module 206, to determine or at least estimate a current location of that user device 104. As described in greater detail below, the learning model employed in the learning model module 208 is configured to localize the user devices 104 within the local area 101 in an "online" manner using data generated from signals received from the user devices 104 during normal operations without the use of fingerprinting, site surveying, or other types of "offline" operations for gathering data regarding characteristics of the local area 101 prior to the actual localizing of the user devices 104. Further, in at least some embodiments, the learning model may be configured to possess an ability to maintain historical data regarding previously-received local wireless communications 120 that allow the learning model to recognize previous temporal patterns in received local wireless communications 120 while adapting to changing conditions within the local area 101.

Figure 3:
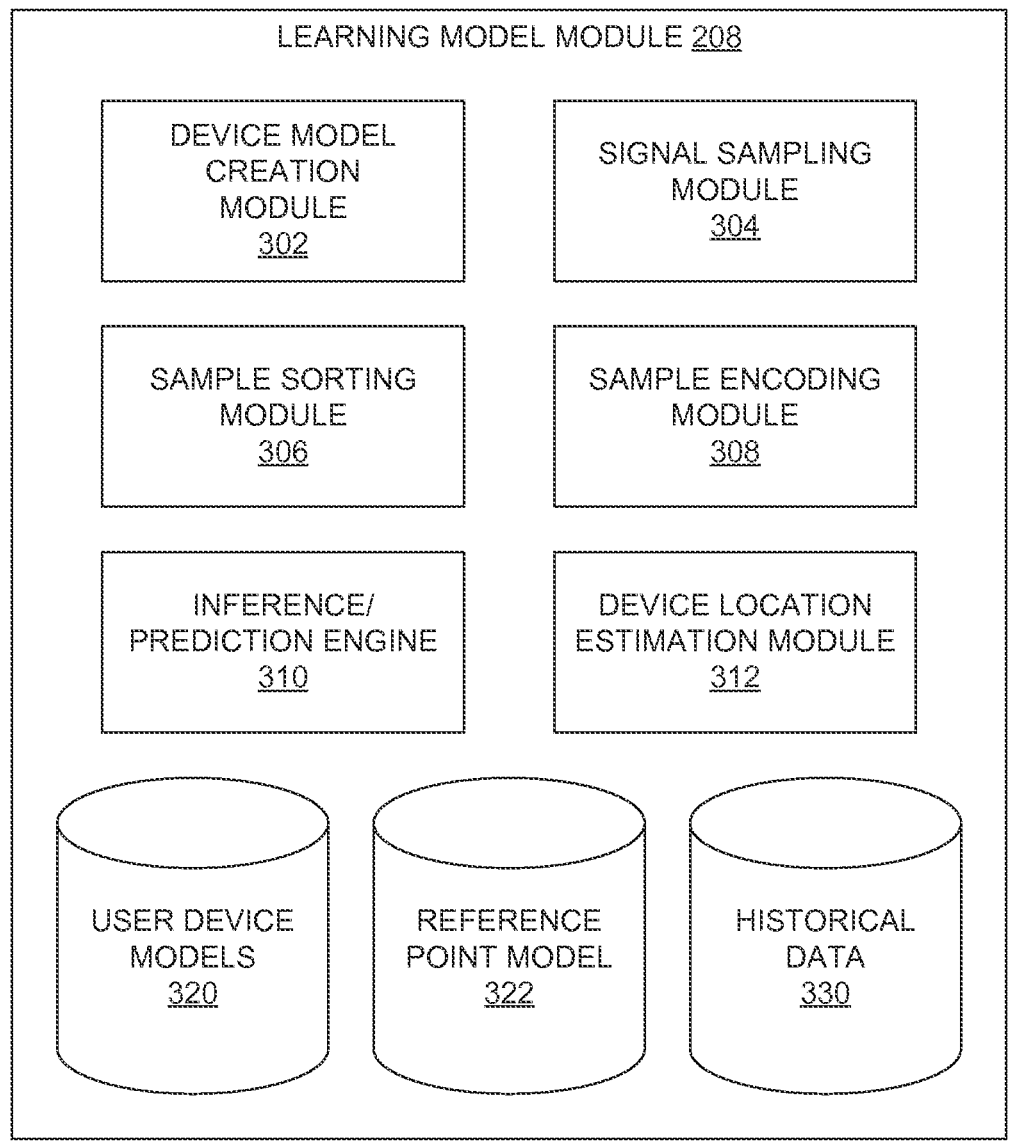
FIG. 3 is a block diagram of an example learning model module employable in the wireless reference point of FIG. 2.

FIG. 3 is a block diagram of an example of the learning model module 208 employable in the wireless reference point 102 of FIG. 2. In the particular example of FIG. 3, the learning model module 208 may include a device model creation module 302, a signal sampling module 304, a sample sorting module 306, a sample encoding module 308, an inference/prediction engine 310, and a device location estimation module 312. Other modules not specifically depicted in FIG. 3 may also be included in the learning model module 208, but such are not mentioned herein to simplify the following discussion. In other embodiments, one or more of the modules 302-312 of FIG. 3 may not be included in the learning model module 308. In at least some examples, the learning model module 208 may also include one or more databases or datasets, such as one or more user device models 320, a reference point model 322, and/or historical data 330 describing the received local wireless communications 120. In yet other embodiments, one or more of the modules 302-312 and/or databases 320, 322, and 330 may be located alternatively in another device, such as, for example, another wireless reference point 102 or a server that is communicatively coupled with the wireless reference point 102.

The device model creation module 302 may be configured to create a learning model for a particular user device 104. The learning model module 208 may utilize the created learning model to estimate the location of that user device 104 in an online manner during normal operations without preceding "offline" operations to characterize the loca are 101, such as fingerprinting and the like. In one example, the device model creation module 302 may create the learning model associated with the particular user device 104 in response to the user device identification module 206 (FIG. 2) first encountering or identifying the user device 104. Additionally, the device model creation module 302 may store the created learning model as one of the user device models 320 for subsequent retrieval when the user device identification module 206 subsequently detects the same user device 104 within the local area 101.

One example of the created learning model may be a model based on a portion of the human brain, such as the cerebral cortex. Other possible machine-based learning models or techniques, such as, for example, some types artificial neural networks (ANNs) or reinforcement learning systems, may be employed in other examples. An example of a learning model is described below in conjunction with FIGS. 9 and 10.

In some examples, the device model creation module 302 may also configure the created learning model for the user device 104 associated therewith. For example, certain aspects of the model may be tailored to the particular type of user device 104, such as the particular communication protocol being employed by the user device 104, the specific hardware employed in the user device 104, and so on. In other examples, all types of user devices 104 may correspond to the same model, thus possibly indicating that no particular configuration of the model is warranted.

Similarly, in some embodiments, the device model creation module 302 may create an encoder for the sequence of samples from the communication signal transmitted by the user device 104, as received at the wireless reference point 102. Such an encoder, in some embodiments, may receive the sequence of samples, or some version of those samples, and encode them into a form that the created learning model may receive as input. For example, the sequence of samples may be encoded into a sparse distributed representation (SDR) (or, alternately, sparse distributed memory (SDM)) such that only a small percentage of the input to the learning model is active at any one time while, at the same time, a significant absolute number of separate elements of the input to the learning model are activated to represent a particular state in the model. Sparse distributed representations are discussed below in conjunction with FIG. 10.

The signal sampling module 304, the sample sorting module 306, and the sample encoding module 308 may be configured to generate a sequence of values from the received communication signal from a user device 104 that is provided to the learning model corresponding to the user device 104 for localization of the user device 104. One or more of these modules 304, 306, and 308 may be omitted in some embodiments.

The signal sampling module 304 may be configured to sample a particular quantity or characteristic of the communication signal received from the user device 104 from time to time to generate a sequence of samples. In one example, the signal sampling module 304 may sample the communication signal at some periodic rate, such as, for example, once every second, once every two seconds, or the like. In other examples, the periodic rate may be any rate that is faster (e.g., once every 100 milliseconds (msec), once every 200 msec, etc.) or slower (e.g., once every five seconds) in other examples.

In some embodiments, the signal sampling module 304 may sample any particular type of measurable characteristic that relates in some way to at least a distance between the user device 104 and the wireless reference point 102. For example, the measured characteristic may be the Received Signal Strength Indicator (RSSI) of the received communication signal. Other measured characteristics of the received communication signal that may be employed in other embodiments include, for example, link quality and channel quality of the received communication signal.

The sample sorting module 306 may be configured to sort or apportion each of the sequence of samples from the user device 104 into intervals, such as, for example, bins of a histogram. In some embodiments, this sorting functionality may reduce the possible number of values provided to an encoder, such as may be provided in the sample encoding module 308. Reducing the possible numbers may, in turn, simplify the structure of the encoder. In some examples, the sample sorting module 306 may be unnecessary, such as in embodiments in which the samples generated by the signal sampling module 304 may be received directly at the sample encoding module 308.

The sample encoding module 308 may be configured to encode samples of the communication signal from the user device 104 received from the signal sampling module 304 or the sample sorting module 306 to generate a sequence of values for use as input to the learning model corresponding to the user device 104. As described above in one example, the encoded samples may be in the form of sparse distributed representations (SDRs). The sample encoding module 308 may encode the received samples into other types of representations, depending on the type of input expected by the specific learning model employed for the user device 104.

Various parameters of any, or all, of the signal sampling module 304, the sample sorting module 306, and the sample encoding module 308 may be based on a reference point model 322 of the wireless reference point 102. For example, the reference point model 322 may specify the rate or period at which the received communication signal is sampled, the size of the intervals into which the samples may be sorted, and/or the type of encoding to be performed on the sorted or unsorted samples. Such parameters may be based, at least in part, on the particular circuitry and software employed in the wireless reference point 102.

Any, or all, of the signal sampling module 304, the sample sorting module 306, and the sample encoding module 308 may store raw samples, sorted samples, encoded samples, and/or the like as historical data 330. The historical data 330 may be stored within the wireless reference point 102, or within some data storage device (not shown in FIG. 1) that is communicatively coupled with the wireless reference point 102. For example, the historical data 330 may be stored to a server or other cloud infrastructure available via a WAN (e.g., the Internet) using a WAN interface (not shown in the wireless reference 102 of FIG. 2). The historical data 330 may serve as functional input (in addition to the input associated with the current raw, sorted, or encoded sample of the communication signal) to the learning model corresponding to the user device 104 of current interest, and/or may be employed for post-processing analysis of the performance of any portion of the learning model module 208.

The inference/prediction engine 310 may be configured to receive the sequence of values generated by the sample encoding module 308 based on the communication signal from the user device 104 and process the values to generate an output or state using the user device model 320 for that same user device 104 that may be used to localize the user device 104. In other embodiments, the inference/prediction engine 310 may receive un-encoded samples, which may or may not be sorted by the sample sorting module 306, for processing to produce the output. In at least some examples, the inference/prediction engine 310 may process the incoming sequence of values without reference to time (and, thus, without any notion or concept of time) associated with the values, even though the samples used to generate the values may be captured at a particular rate, as indicated above.

As is described in greater detail below for one particular embodiment, the inference/prediction engine 310, by use of the user device model 320 for the user device 104 transmitting the communication signal, may produce a particular output or state based on the current input and previous inputs that have been provided to the user device model 320 (alternatively, the learning model 320 or, more simply, the model 320) as well as the particular order in which those inputs were provided to the model 320. Accordingly, the model 320 may allow the inference/prediction engine 310 to infer or recognize a current pattern of inputs as similar to previously-seen input patterns. Further, the model 320 may allow the inference/prediction engine 310 to predict future inputs based on the present and past inputs.

In some examples, the inference/prediction engine 310 may be configured to predict a predetermined number of future input values (e.g., the next input value, the next two input values, the next three input values, etc.) ahead of a current value of the sequence of values. Further, the predicted future input values for each current input value received may be based on the current input value and a predetermined number of immediately-preceding input values determined by a sample window size. For example, using a sample window size of five samples, the inference/prediction engine 310 may be configured to predict one or more future input values based on the current input value and the four preceding input values. In other embodiments, the sample window size may be any positive integer greater than 1. In such examples, the inference/prediction engine 310 may not generate any predictions until enough input values have been generated to fill the sample window. Once the sample window is filled, the inference/prediction engine 310 may predict one or more future input values for each input value generated.

In yet other embodiments, the inference/prediction engine 310 may base its prediction of one or more future input values on any or all of the preceding input values, which may, in turn, be based on any or all of the historical data 330, and thus may not be limited to a particular sample window. In addition, neither the particular preceding input values upon which the predictions are based, nor the predicted one or more future input values that are based on the preceding input values, need form a contiguous series of input values within the sequence of values.

The inference and prediction capabilities of the model 320, as described above, may facilitate both adaptability and stability in light of changing transmission conditions in the local area 101, changing transmission characteristics of the user device 104, changing reception characteristics of the wireless reference point 102, and so on. For example, in some embodiments, a relatively larger sample window size may allow the inference/prediction engine 310 to predict or infer a larger number of future input values, or one or more input values reaching further into the future, than what may be produced using a relatively smaller sample window size. Accordingly, a relatively larger window size may reduce variability and/or increase stability in estimating the location of the user device 104. Conversely, a relatively smaller window size may provide more confidence and accuracy between the predicted input values and the input values actually received, but may contribute less to overall stability in estimating the location of the user device 104.

In one example, the wireless reference point 102 may be configured to combine its own user device model 320 with the user device models 320 of the same user device 104 as generated by other wireless reference points 102 within the local area 101 to generate an overall learning model for the user device 104. In this example, the wireless reference point 102 may receive and store the user device models 320 for the other wireless reference points 102. The device model creation module 302 may generate an overall, combined user device model 320. The inference/prediction engine 310 may receive sample data (e.g., raw sample data, sorted sample data, and/or encoded sample data) from this and other wireless reference points 102 and provide that input to the combined user device model 320 to yield a single output that may be indicative of the current location of the user device 104 within the local area 101.

The device location estimation module 312 may be configured to map the output of the inference/prediction engine 310 to a particular location, or set of locations, of the user device 104 within the local area 101. The mapping may be based, in part, on correlating current or previous outputs of the inference/prediction engine 310 to information that represents the actual location of user device 104. Such information may be based on human perception of the location of the user device 104, on interaction of the user device 104 with another device or system, such as, for example, a Near-Field Communication (NFC™) (e.g., a point-of-sale (POS) station that may interact with the user device 104), or on other means.

In some embodiments, the device location estimation module 312 may receive corresponding outputs from one or more other wireless reference points 102 in the local area 101 and combine those outputs to provide an estimate of the current location of the user device 104. For example, the device location estimation module 312 may combine the outputs with knowledge regarding a location of each of the wireless reference points 102 to triangulate the location of the user device 104. Other ways of combining the outputs may be employed in the device location estimation module 312 in other examples.

Concerning the use of information from multiple wireless reference points 102, any one or more of the wireless reference points 102 may receive information from other wireless reference points 102, such as the communication signal samples, as well as user device models 320, as discussed above. In other embodiments, each of the wireless reference points 102 may provide user device models 320, as well as sample information, to a server via a WAN, or to another device within the local area 101, which may then process that information to derive or estimate a current location of the user device 104.

Figure 4:
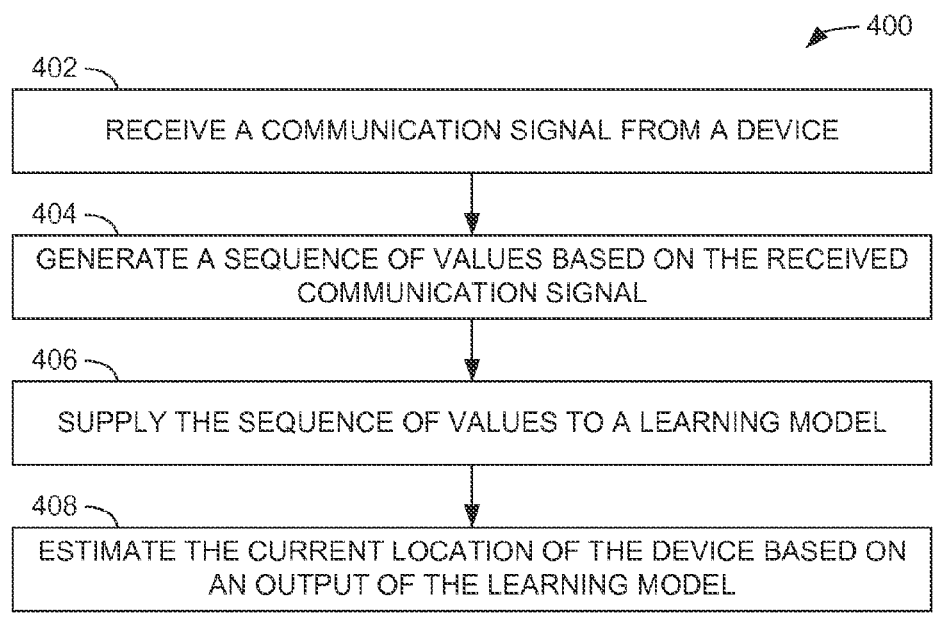
FIG. 4 is a flow diagram of an example method of localizing a device based on a learning model.

FIG. 4 is a flow diagram of an example method 400 of localizing a device (e.g., the user device 104 of FIG. 1) based on a learning model associated with the device (e.g., the user device model 320 of FIG. 3). In the following examples, the wireless reference point 102 of FIG. 1, including the various components illustrated in the learning model module 208 of FIG. 3, is presumed to perform the various operations of the method 400. However, other devices or components not specifically described herein may perform the operations of the method 400 in other embodiments.

In the method 400, a communication signal is received from a device during a period of time (operation 402). In various examples described herein, the device may include the user device 104 of FIG. 1, such as a smartphone, laptop computer, tablet computer, or another device configured to communicate with the wireless reference point 102 in the local area 101. In one example, the communication signal that is transmitted from the device may be a report or a beacon that the device transmits in a broadcast manner to various listeners, including the wireless reference point 102, as well as any additional wireless reference points 102 located in the local area 101. In another example, the communication signal being transmitted from the device may be a response to a request wireless transmitted by the wireless reference point 102, such as an active probe request in WiFi® communications. In at least some embodiments, the request is directed in a unicast manner specifically to the receiving device, to which the device responds in a similar manner.

The wireless reference point 102 or some device communicatively coupled therewith may then generate a sequence of values from the communication signal that is received by the wireless reference point 102 during the period of time (operation 404). As discussed above, in some examples, the sequence of values may be based on periodic samples of some characteristic of the communication signal, such as RSSI, which may then possibly be further processed by way of sorting and/or encoding.

The resulting sequence of values may then be supplied to a learning model 320 (operation 406). In one example, the learning model 320 may be configured to produce a state or output based on past values in the sequence of values, as well as at least one predicted value of the sequence of values. In at least some embodiments, the use of at least one predicted value, which may also be based on past values in the sequence, may facilitate a stable output of the learning model 320 in the presence of significant, but temporary, variations of the sequence of values. In some examples, such variations may be experienced when employing RSSI or other characteristics employed for the communication signal samples, but other types of samples of the communication signal may be similarly affected in other embodiments. Such variations may be caused by, for example, changes in communication signal characteristics of the user device 104, changes in environmental conditions that may affect the communication signal, the layout of the local area 101, such as the existence, location, and/or orientation of various physical features (e.g., walls, partitions, furniture, and so on), and the number and/or location of people within the local area 101. Further, the learning model 320 may adapt over time to more permanent changes in the local area 101. The current location of the user device 104 within the local area 101 may then be estimated during the period of time based on the state or output of the learning model 320 (operation 408).

While the operations 402 through 408 of FIG. 4 (as well as the operations of other methods illustrated herein) are shown as occurring in a specific order, other orders of operation, including concurrent execution of two or more operations, are also possible. For example, operations 402 through 408 may occur periodically, continually, or in some other repetitive manner, possibly in a parallel, simultaneous, or concurrent fashion, as the user device 104 transmits communication signals within the local area 101, which the wireless reference point 102 may then receive and process to estimate a location of the user device 104, as described above. Further, the operations 402 through 408 may be applied to each separate user device 104 that transmits communication signals within the local area 101, thus estimating the location of each of the user devices 104 within the local area 101.

Figure 5:
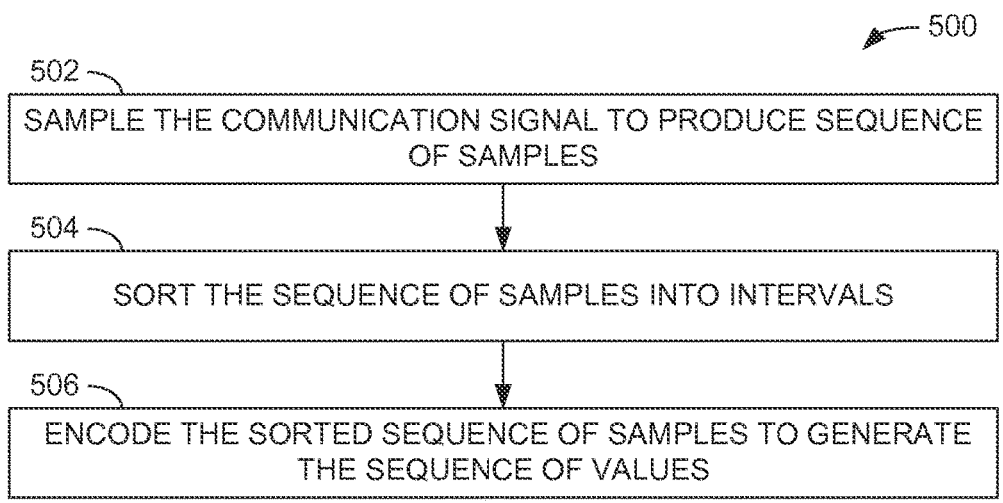
FIG. 5 is a flow diagram of an example method of processing a communication signal from the user device for use in a learning model.

FIG. 5 is a flow diagram of an example method 500 of processing a communication signal from the user device 104 for use in a learning model (e.g., user device model 320). In the method 500, the communication signal may be sampled to produce a sequence of samples (operation 502). The produced sequence of samples may be samples of any characteristic of the communication signal transmitted by the user device 104 that may be employed ultimately to determine a location of the user device 104 within the local area 101. Examples of the characteristic of the communication signal may include, but are not limited to, RSSI, link quality, and channel quality. In at least some embodiments, the sampling occurs periodically at a set sampling rate, such as once every one or more seconds, once every fraction of a second (e.g., once every 500 msec), or at some other rate that yields meaningful information as to changes in the sampled characteristic.

In some examples, the sequence of samples may be sorted into a number of intervals (operation 504). For example, each of the samples may be sorted into a "bin" corresponding to a particular interval of values for the characteristic. The intervals may collectively and contiguously cover a particular range of values of the characteristic. Further, in some cases, the intervals may be equal in size over a linear scale, a logarithmic scale, or another scale for the characteristic based on the nature of the characteristic. Additionally, the size of the intervals may be set such that the number of significant digits representing each of the measured samples is reduced while still providing meaningful information to the learning model.

The sorted sequence of samples may then be encoded to generate the sequence of values (operation 506) that are to be supplied to the learning model 320, as indicated in operation 406 of FIG. 4. In one example, the encoding may result in each of the sorted samples being mapped to a corresponding sparse distributed representation (SDR). In one example, an SDR may include a large number of bits (binary digits) (e.g., 50 bits, 100 bits, and so on) in which a relatively low percentage of these bits (e.g., less than five percent, less than three percent, and the like) are active in any one sample. In some embodiments, the similarity between two samples may be judged based on the number or percentage of active bits that are common between the two samples. In other embodiments, the unsorted sequence of samples provided in operation 502 may be supplied directly to operation 506 for encoding.

Figure 6:
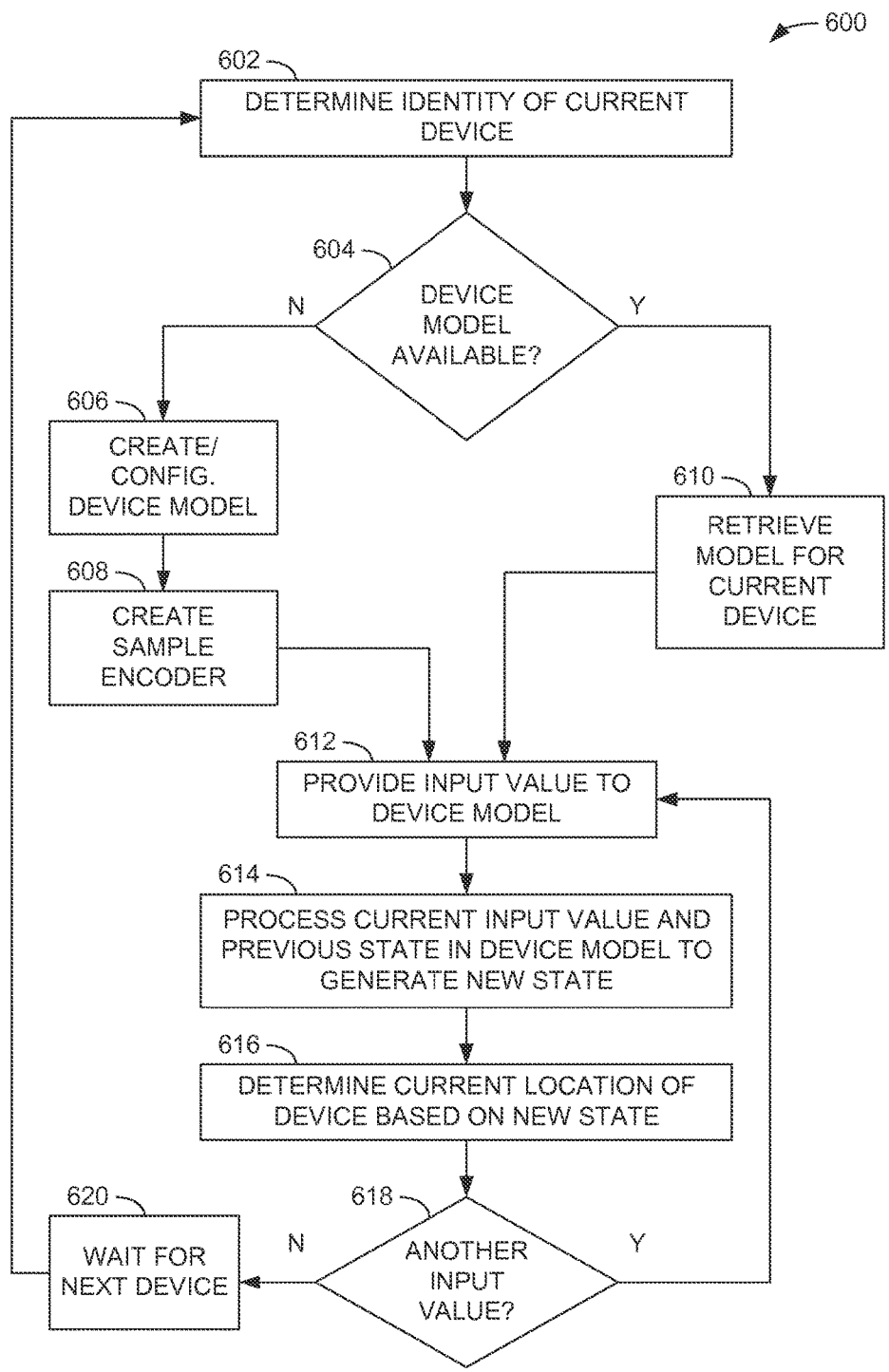
FIG. 6 is a flow diagram of an example method of processing a sequence of values based on samples of the communication signal.

FIG. 6 is a flow diagram of an example method 600 of processing a sequence of values based on the samples of the communication signal being received from a user device 104. While the wireless reference point 102 of FIG. 1 is presumed to perform the various operations of the method 600, one or more other devices communicatively coupled with the wireless reference point 102 that receives a communication signal from a user device 104 may perform one or more of the operations. In the method 600, an identity of the current user device 104 from which the communication signal is being received at the wireless reference point 102 is determined (operation 602). In one embodiment, the identity of the current user device 104 may be determined based on information included in the communication signal, such as a media access control (MAC) address of the user device 104. Other identifiers for either or both of the user device 104 and a user of the user device 104 may be employed in other embodiments.

Based on the received identity of the user device 104, the wireless reference point 102 may then determine if a learning model 320 for the identified user device 104 is available (operation 604). For example, if the wireless reference point 102 has previously received a communication signal from the user device 104, the wireless reference point 102 may have previously generated a learning model 320 for that user device 104. If the learning model 320 is available, the wireless reference point 102 may then retrieve the model 320 for the current user device 104 (operation 610), such as from the user device models 320 of FIG. 3. Otherwise, if a learning model 320 for the current user device 104 is not present, the wireless reference point 102 may create and/or configure a learning model 320 for the user device 104 (operation 606). In some examples, the wireless reference point 102 may also create a sample encoder (operation 608), as described above in conjunction with FIG. 5. In some examples, the created and configured learning model 320 and/or the created encoder may be the same for each of the user devices 104 that are detected by the wireless reference point 102 within the local area 101. In other examples, the created and configured learning model 320 and/or the created encoder may be different from others created for other user devices 104 based on one or more factors, such as, for example, a type, manufacturer, or model number of the user device 104. Such information may be incorporated, in some examples, within the communication signal received at the wireless reference point 102 from the user device 104.

Once the appropriate learning model 320 for the current user device 104 has been created or retrieved, the sequence of values generated from the sampling, sorting, and/or encoding of the communication signal received from the current user device 104 is supplied to the learning model 320 for that user device 104 (operation 612). In some examples, each value is provided, one at a time in order of receipt, to the learning model 320 to generate a new output or state of the learning model 320. To that end, the learning model 320 may employ a current state of the model 320 to process a current input value, thus generating a new state of the model 320 (operation 614). As mentioned above, the current state of the model 320 may include or reflect previous input values of the communication signal that have been supplied to the model 320, as well as one or more predicted future input values produced by the model 320.

Based on the new state or output of the model 320, the current location of the user device 104 may be determined or estimated (operation 616). In some embodiments, the learning model 320, or, more broadly, the wireless reference point 102, may receive additional information that indicates the current location of the user device 104 such that the new state generated by the model 320 may be correlated to the current location so that similar future states of the model 320 may be interpreted as indicating the same or similar location. As indicated above, such information may relate a particular output or state of the model 320 to a human perception of the location of the user device 104, or to an interaction of the user device 104 with another device or system, such as a POS device, an NFC™ station, or other system.

In some examples, the current output or state of the learning model 320 being employed in the wireless reference point 102 may be combined with the current output or state of one or more learning models 320 for the same current user device 104 being utilized in one or more other wireless reference points 102 to determine the current user device 104 location within the local area 101. Those examples are discussed more fully below in connection with FIGS. 7 and 8.

If another input value from the communication signal of the same user device 104 is available in the sequence of values (operation 618), that next input value may be provided to the learning model 320 of the user device 104 (operation 612) and processed to generate the next state (operation 614), which may be employed to update the current location of the user device 104 (operation 616) as described above. If, instead, no values remain from the sequence of values associated with the current user device 104, the wireless reference point 102 may then await a communication signal from another user device 104 (operation 620). The identity of that user device 104 may then be determined (operation 602), the model 320 associated with that user device 104 may then be created (operations 606, 608) or retrieved (operation 610), and the sequence of values generated from the communication signal transmitted from that user device 104 may then be provided to the appropriate device model 320 (operation 612) and processed (operation 614) as discussed earlier to determine a current location of that user device 104 (operation 616). In examples in which more than one user device 104 is present and transmitting within the local area 101, the wireless reference point 102 may actively maintain a separate model 320 for each user device 104, concurrently processing the input values generated from the received communication signal of each user device 104 to determine or estimate the current location of each user device 104 within the local area 101.

Figure 7:
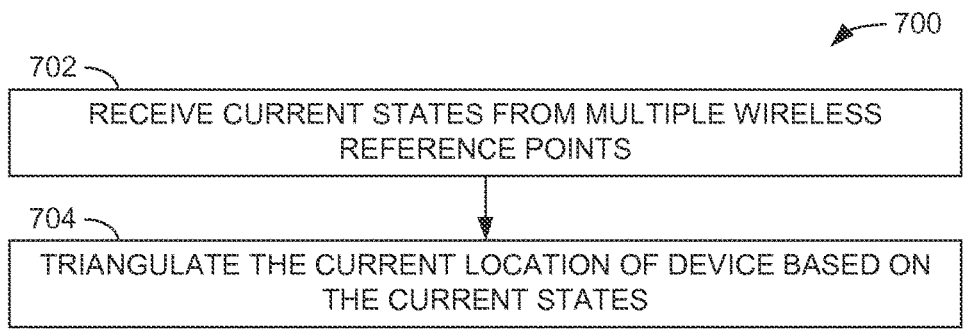
FIG. 7 is a flow diagram of an example method of estimating the device location using triangulation based on output from learning models of multiple wireless reference points.

FIG. 7 is a flow diagram of an example method 700 of estimating the location of a user device 104 using triangulation based on outputs from learning models 320 of multiple wireless reference points 102. In the method 700, the current states or outputs of the learning models 320 for the current user device 104 maintained in the multiple wireless reference points 102 may be received (operation 702). In one example, the current states or outputs may be received at one of the wireless reference points 102 for further processing. In other embodiments, the current states or outputs may be received at a server or other system at which the processing of that information is to occur. Based on the current states or outputs of the learning models 320 of the multiple wireless reference points 102, the current location of the user device 104 may be estimated or determined via triangulation (operation 704). In FIG. 1, for example, the state or output of the learning model 320 corresponding to each of the wireless reference points 102A, 102B, and 102C may indicate a distance from the corresponding wireless reference point 102. By triangulating using these distances and the locations of the corresponding wireless reference points 102 within the local area 101, a location for the user device 104 may be determined or estimated.

In some embodiments in which triangulation may or may not be employed, as described above, the one or more wireless reference points 102 may employ phased-array antennas and/or directional beam-forming techniques that may define a more narrowly-focused area in which a user device 104 may be localized. Consequently, stabilization of signal parameters and the localization of a user device 104, as described herein, may be enhanced from the use of such antennas and techniques, as may be found in high-end infrastructure environments.

Figure 8:
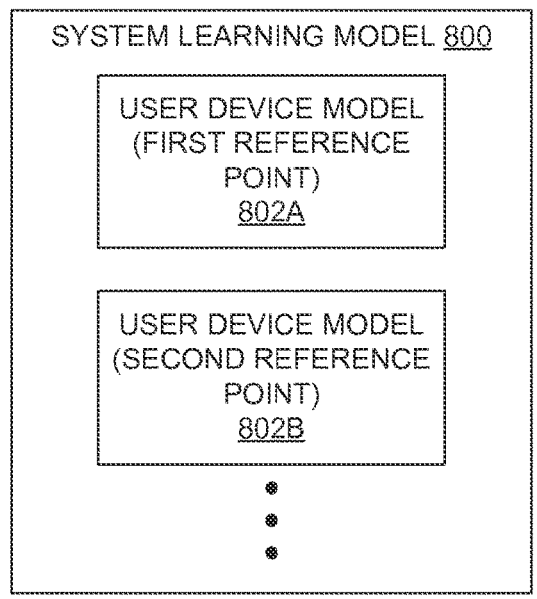
FIG. 8 is a block diagram of an example system learning model incorporating multiple wireless reference point learning models.

In another example, FIG. 8 is a block diagram of an example system learning model 800 incorporating user device models 802A, 802B, and so on (or, alternatively, user device model 802 or user device learning model 802) for a current user device 104, wherein each user device model 802 is associated with a separate wireless reference point 102. In one embodiment, each of the user device models 802 for the current user device 104 may be maintained within its corresponding wireless reference point 102, with each generating a current state or output. These current states or outputs may then be provided to a wireless reference point 102 or other system, which then processes the current states or outputs to yield an overall state or output of the system learning model 800 of the user device 104. The overall state or output may be employed to determine or estimate the current location of the user device 104.

In another embodiment, the entire system learning model 800 for the user device 104, including each of the incorporated user device learning models 802, may be employed by one of the wireless reference points 102 or another system. As a result, the wireless reference point 102 or other system that includes the system learning model 800 and component user device learning models 802 may receive the sequence of values from the communication signal of the corresponding user device 104 and provide those values to the system learning model 800 to estimate or determine the current location of the user device 104.

As mentioned above, any learning model 320 capable of receiving sequences of values, recognizing patterns in the sequences of values, and predicting future values based on previously received values, such as various types of machine learning models and artificial neural networks (ANNs), may be employed in the various embodiments described above. Such learning models 320 may include or utilize, in some examples, SDRs and similar memory representations modelled on the human brain.

Figure 9:
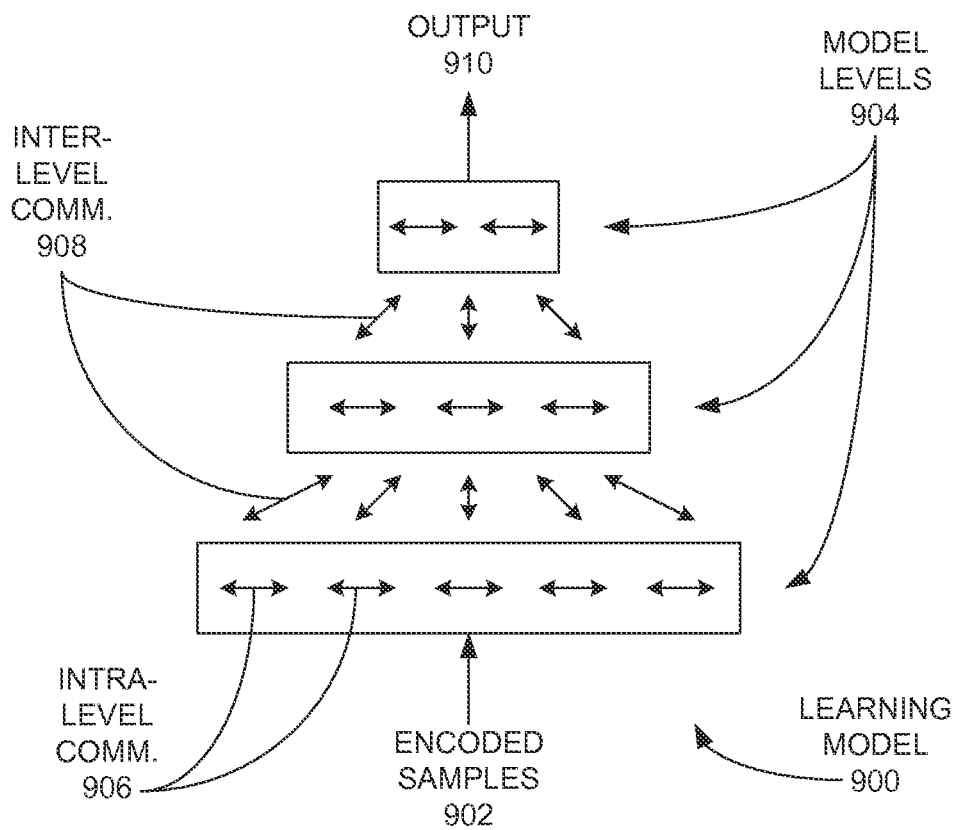
FIG. 9 is a graphical representation of an example multiple-level learning model.

FIG. 9 is a graphical representation of an example multiple-level learning model 900, which may serve as a user device model 320, as depicted in FIG. 3. One example of such a multiple-level model is the Hierarchical Temporal Memory (HTM) provided as part of the Numenta Platform for Intelligent Computing (NuPIC®) supported by Numenta®, Inc. Other examples of machine learning models, such as reinforcement learning models and other ANNs, may incorporate similar concepts or structures as well. As illustrated in FIG. 9, the learning model 900 may include multiple semantic model levels 904, each of which may process input values provided thereto from a lower model level 904 and provide output to a higher model level 904 via inter-level communications 908. In some examples, information may also be provided from higher model levels 904 to lower model levels 904 via the inter-level communications 908. Also, in some embodiments, intra-level communications 906 may occur within one or more of the model levels 904. As shown in the particular example of FIG. 9, each of the model levels 904 may process its inputs and provide an overall smaller result or output to the following higher model level 904. However, multiple-level models of other examples are not so constrained, as some model levels 904 may actually provide a larger amount of data, such as a larger SDR representation, to a higher model level 904 in some embodiments. In some embodiments, the model levels 904 collectively may correlate with a single layer of the neo-cortex portion of the human cerebral cortex. More specifically, in one example, the model levels 904 collectively may represent what is commonly referred to as the "Layer 3" neurons of the neo-cortex.

In the example of FIG. 9, the learning model 900 may receive encoded samples 902 (e.g., as a sequence of values, as indicated above) based on samples of one or more characteristics of a communication signal received from a user device 104, as described above. In one example, each of the values may be an SDR of the sampled characteristic, and each of the values may be provided, in sequence as sampled, to the learning model 900. The resulting current output 910 or state of the learning model 900 may thus reflect the current location of the user device 104 based on pattern matching and/or value prediction facilitated by the learning model 900.

Figure 10:
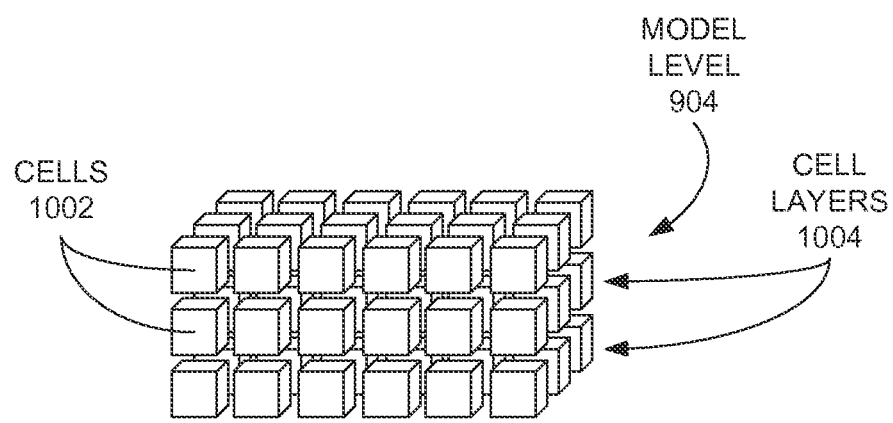
FIG. 10 is a graphical representation of example individual cells of a level of the multiple-level learning model of FIG. 9.

FIG. 10 is a graphical representation of example individual "cells" 1002 of a model level 904 of the learning model 900 of FIG. 9. Depending on the particular learning model 900, the cells 1002 may represent a single neuron or group of neurons, or some other construct that represents or emulates a portion of the human brain. As shown, multiple layers 1004 of cells 1002 may form a single model level 904 of the learning model 900, although other examples may include but a single layer 1004. Each cell 1002 may be configured to receive and process data from lower cell layers 1004, as well as communicate with nearby cells 1002 within its layer 1004 and nearby layers 1004. Particular characteristics of this inter-cell communication, as well as the intra-level communications 906 and the inter-level communications 908 of FIG. 9, may adapt or change over time as the sequence of values 902 are provided to, and processed by, the learning model 900. Such characteristics of these types of communications may include, for example, the particular cells 1002 and layers 1004 with which each cell 1002 or layer 1004 communicates, the particular weighting or other processing applied to each of those communications, and so on.

Also, in one embodiment, each of a set of cells 1002, such as the cells 1002 of a lowest layer 1004 of a lowest model level 904, may be set to correspond to an SDR of an encoded sample 902 provided as input to the learning model 900. Such an input may facilitate pattern matching, sample prediction, and other functions often associated with at least some types of learning models 900.

In yet other examples, other machine-learning or ANN models or algorithms that do not exhibit one or more characteristics of the learning model 900 described with respect to FIGS. 9 and 10 may also be employed as the learning models 320, such as those facilitated by the inference/prediction engine 310 of the learning model module 208 of FIG. 3, described above.

In at least some of the embodiments described above, a learning model may be employed to process samples of one or more characteristics of a communication signal transmitted by a user device and received by a wireless reference point to determine or estimate a location of the user device within a local area that includes the user device and the wireless reference point. In some examples, the learning model may receive one or more sequences of values representing the samples of the communication signal characteristics, recognize patterns in those values, and base estimations of the user device location on those recognized patterns. This use of sample history may allow the determination of user device location without the need for fingerprinting, site surveying, or similar operations specifically designed to characterize the communication characteristics of a local area prior to functional operation of the locating system. Further, the learning model may be capable of predicting future values of a sequence and employing those predicted values to provide correct location information for the user device in the presence of signal noise, temporary environmental changes, increases or decreases in the number of people present, and other alterations to the local area environment. The learning model may thus adapt to such changes in the local area on-the-fly without halting normal operations to re-characterize the local area offline.

Figure 11:
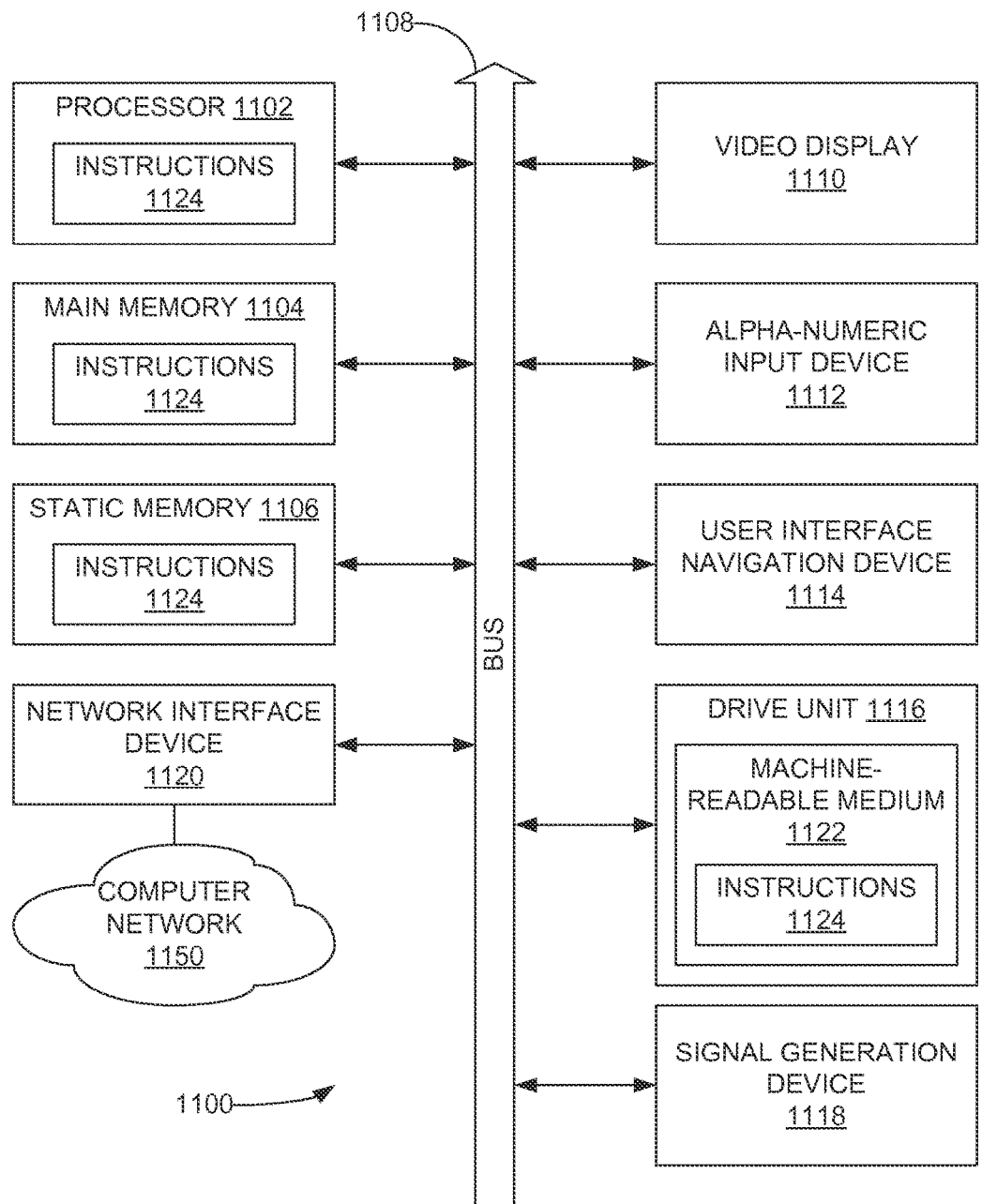
FIG. 11 is a diagrammatic representation of a machine in the example form of a computer system within which a set of instructions may be executed for causing the machine to perform any one or more of the methodologies discussed herein.

FIG. 11 illustrates a diagrammatic representation of a machine in the example form of a computer system 1100 within which a set of instructions may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer, a tablet computer, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106 which communicate with each other via a bus 1108. The computer system 1100 may further include a video display 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive 1116, a signal generation device 1118 (e.g., a speaker) and a network interface device 1120.

The disk drive 1116 includes a machine-readable medium 1122 on which is stored one or more sets of instructions and data structures (e.g., instructions 1124) embodying or utilized by any one or more of the methodologies or functions described herein. The instructions 1124 may also reside, completely or at least partially, within the static memory 110, within the main memory 1104, and/or within the processor 1102 during execution thereof by the computer system 1100, the main memory 1104 and the processor 1102 also constituting machine-readable media.

The instructions 1124 may further be transmitted or received over a computer network 1150 via the network interface device 1120 utilizing any one of a number of well-known transfer protocols (e.g., HyperText Transfer Protocol (HTTP)).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions 1124. The term "machine-readable medium" shall also be taken to include any medium that is capable of storing, encoding or carrying a set of instructions for execution by the machine and that cause the machine to perform any one or more of the methodologies of the present inventive subject matter, or that is capable of storing, encoding or carrying data structures utilized by or associated with such a set of instructions 1124. The term "machine-readable medium" shall accordingly be taken to include, but not be limited to, solid-state memories, and optical and magnetic media.

Throughout this specification, plural instances may implement components, operations, or structures described as a single instance. Although individual operations of one or more methods are illustrated and described as separate operations, one or more of the individual operations may be performed concurrently, and the operations may be performed in an order other than that illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The Abstract of the Disclosure is provided to comply with 37 C.F.R. §1.72(b), requiring an abstract that will allow the reader to quickly ascertain the nature of the technical disclosure. The Abstract is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments include more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although embodiments of the present disclosure have been described with reference to specific example embodiments, it will be evident that various modifications and changes may be made to these embodiments without departing from the broader scope of these embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of localizing a device, the method comprising:

receiving, during a period of time, by a wireless reference point, a communication signal from the device;

generating a sequence of values from the communication signal, as received by the wireless reference point during the period of time, the generating of the sequence of values comprising:

periodically sampling, during the period of time, a characteristic of the communication signal from the device to produce a sequence of samples; and encoding the sequence of samples to generate the sequence of values;

supplying the sequence of values to a learning model configured to generate an output based on past values of the sequence of values and at least one predicted future value of the sequence of values relative to a current value of the sequence of values; and estimating, during the period of time, using at least one hardware processor, a current location of the device based on the output of the learning model.

2. The method of claim 1, wherein the sequence of values is based on received signal strength indicator values of the communication signal as received by the wireless reference point.

3. The method of claim 1, wherein the sequence of values is based on at least one of a link quality and a channel quality of the communication signal as received by the wireless reference point.

4. The method of claim 1, further comprising:
receiving, by the wireless reference point, an identifier for the device;
determining whether a device-specific model for the device exists; and
generating, based on the device-specific model for the device not existing, the device-specific model for the device, wherein the learning model comprises the device-specific model.

5. The method of claim 4, wherein the identifier for the device comprises a media access control address of the device.

6. The method of claim 1, wherein the generating of the sequence of values further comprises:
sorting the sequence of samples into a plurality of intervals according to a magnitude of each of the samples;
wherein the encoding of the sequence of samples to generate the sequence of values is based on the sorted sequence of samples.

7. The method of claim 1, wherein the sequence of values comprise sparse distributed representations of the sequence of samples.

8. The method of claim 1, wherein the learning model comprises a machine learning model.

9. The method of claim 1, wherein the at least one predicted future value of the sequence of values comprises a future value of the sequence of values at a predetermined number of values ahead of the current value of the sequence of values.

10. The method of claim 1, wherein the learning model is configured to generate the output based on the past values of the sequence of values without a previous site surveying operation.

11. The method of claim 1, wherein:
the wireless reference point comprises a first wireless reference point, the sequence of values comprises a first sequence of values, and the learning model comprises a first learning model corresponding to the first wireless reference point;
the method further comprises receiving, during the period of time, by at least a second wireless reference point, the communication signal from the device;
generating at least a second sequence of values from the communication signal, as received by the at least second wireless reference point, during the period of time; and
supplying the at least second sequence of values to at least a second learning model corresponding to the at least second wireless reference point and configured to generate at least a second output based on past values of the at least second sequence of values and at least one predicted future value of the at least second sequence of values; and the estimating of the current location of the device is based on the output of the first learning model and the at least second output of the at least second learning model.

12. The method of claim 11, wherein the estimating of the current location of the device comprises triangulating the current location of the device based on the output of the first learning model and the at least second output of the at least second learning model.

13. The method of claim 11, wherein the estimating of the current location of the device is based on an output of a third learning model comprising the first learning model and the at least second learning model.

14. A non-transitory computer-readable storage medium comprising instructions that, when executed by at least one hardware processor of a machine, cause the machine to perform operations comprising:
receiving, during a period of time, by a wireless reference point, a communication signal from a device;
generating a sequence of values from the communication signal, as received by the wireless reference point, during the period of time, the generating of the sequence of values comprising:
periodically sampling, during the period of time, a characteristic of the communication signal from the device to produce a sequence of samples; and
encoding the sequence of samples to generate the sequence of values;
supplying the sequence of values to a learning model configured to generate an output based on past values of the sequence of values and at least one predicted future value of the sequence of values; and
estimating, during the period of time, a current location of the device based on the output of the learning model.

15. The non-transitory computer-readable storage medium of claim 14, wherein the operations further comprise:
receiving, by the wireless reference point, an identifier for the device;
determining whether a device-specific model for the device exists; and
generating, based on the device-specific model for the device not existing, the device-specific model for the device, wherein the learning model comprises the device-specific model.

16. A system comprising:
at least one hardware processor; and
memory comprising instructions that, when executed by the at least one hardware processor, cause the system to perform operations comprising:
receiving, during a period of time, by a wireless reference point, a communication signal from a device;
generating a sequence of values from the communication signal, as received by the wireless reference point, during the period of time, the generating of the sequence of values comprising:
periodically sampling, during the period of time, a characteristic of the communication signal from the device to produce a sequence of samples; and
encoding the sequence of samples to generate the sequence of values;
supplying the sequence of values to a learning model configured to generate an output based on past values of the sequence of values and at least one predicted future value of the sequence of values; and estimating, during the period of time, a current location of the device based on the output of the learning model.

17. The system of claim 16, wherein the operations further comprise:
receiving, by the wireless reference point, an identifier for the device;
determining whether a device-specific model for the device exists; and
generating, based on the device-specific model for the device not existing, the device-specific model for the device, wherein the learning model comprises the device-specific model.

18. The method of claim 16, wherein the generating of the sequence of values further comprises:
sorting the sequence of samples into a plurality of intervals according to a magnitude of each of the samples;
wherein the encoding of the sequence of samples to generate the sequence of values is based on the sorted sequence of samples.

* * * * *